(12) United States Patent
Seno

(10) Patent No.: US 11,222,492 B2
(45) Date of Patent: Jan. 11, 2022

(54) LUGGAGE STORAGE SYSTEM AND LUGGAGE MANAGEMENT METHOD

(71) Applicant: Takamitsu Sangyou Co., Ltd., Fukuoka (JP)

(72) Inventor: Hachirou Seno, Fukuoka (JP)

(*) Notice: Subject to any disclaimer, the term of this patent is extended or adjusted under 35 U.S.C. 154(b) by 511 days.

(21) Appl. No.: 16/233,572

(22) Filed: Dec. 27, 2018

(65) Prior Publication Data

US 2019/0139347 A1 May 9, 2019

Related U.S. Application Data

(63) Continuation of application No. PCT/JP2018/012442, filed on Mar. 27, 2018.

(30) Foreign Application Priority Data

Nov. 1, 2017 (JP) .............................. JP2017-211976

(51) Int. Cl.
*G07C 9/00* (2020.01)
*G06Q 10/08* (2012.01)

(52) U.S. Cl.
CPC ..... *G07C 9/00896* (2013.01); *G06Q 10/0836* (2013.01); *G07C 2009/0092* (2013.01)

(58) Field of Classification Search
CPC ...................................................... G07C 9/00
See application file for complete search history.

(56) References Cited

U.S. PATENT DOCUMENTS 5,920,053 A * 7/1999 DeBrouse ............... B64F 1/366
235/375
7,034,683 B2 4/2006 Ghazarian
(Continued)

FOREIGN PATENT DOCUMENTS

CN 105901887 8/2016
CN 105931005 9/2016
(Continued)

OTHER PUBLICATIONS

Taku Kurosu, "Utilizing RF tag for Checked Baggage Management", Monthly Automatic Recognition, Jun. 2, 2005, p. 38-p. 41, vol. 18 No. 7.

(Continued)

*Primary Examiner* — K. Wong
(74) *Attorney, Agent, or Firm* — Soei Patent & Law Firm

(57) ABSTRACT

A luggage storage system includes a tag attached to a luggage, a plurality of storage spot terminals respectively installed in a plurality of storage spots each including a movable spot, a luggage database, and a circuitry configured to: acquire identification information of the tag and a user from a mobile terminal that has read the identification information of the tag at the time of deposit of the luggage and register the identification information in the luggage database, acquire the identification information of the tag and storage spot from the storage spot terminal that has read the identification information of the tag and register the identification information in the luggage database, and acquire the identification information of the tag and the user from the mobile terminal that has read the tag at the time of receipt of the luggage and determine whether or not to return the luggage based on whether or not the identification information of the tag and the identification information of the user are associated with each other in the luggage database.

20 Claims, 14 Drawing Sheets

(56) References Cited

U.S. PATENT DOCUMENTS

| | | | | |
|---|---|---|---|---|
| 7,096,089 | B2* | 8/2006 | Quackenbush | G06Q 10/02 700/226 |
| 7,866,554 | B2* | 1/2011 | Cash | G06Q 10/08 235/384 |
| 9,430,888 | B2* | 8/2016 | Herrala | G07C 9/28 |
| 10,055,620 | B2* | 8/2018 | Bruce | G06K 7/10366 |
| 10,077,120 | B2* | 9/2018 | Thogersen | B65G 65/02 |
| 10,275,845 | B2* | 4/2019 | Mahfouz | G06Q 50/30 |
| 2006/0220857 | A1 | 10/2006 | August et al. | |
| 2016/0148440 | A1 | 5/2016 | Kwak | |

FOREIGN PATENT DOCUMENTS

| | | |
|---|---|---|
| CN | 106097173 | 11/2016 |
| EP | 2851879 | 3/2015 |
| JP | 2001-266092 | 9/2001 |
| JP | 2006-350785 | 12/2006 |
| JP | 2010-023952 | 2/2010 |
| JP | 2011-108285 | 6/2011 |
| JP | 2011-118611 | 6/2011 |
| JP | 2015-219629 | 12/2015 |
| JP | 2016-155674 | 9/2016 |
| JP | 2017-013923 | 1/2017 |
| JP | 2017-014005 | 1/2017 |
| JP | 2017-151846 | 8/2017 |
| KR | 10-2001-0074259 | 8/2001 |
| KR | 1020010074259 | 8/2001 |
| KR | 10-0807921 | 2/2008 |
| KR | 100807921 | 2/2008 |
| KR | 10-1083784 | 11/2011 |
| KR | 101083784 | 11/2011 |
| KR | 10-2014-0131046 | 11/2014 |
| KR | 1020140131046 | 11/2014 |

OTHER PUBLICATIONS

International Search Report dated Jun. 26, 2018 for PCT/JP2018/012442.
International Preliminary Report on Patentability with Written Opinion dated May 14, 2020 for PCT/JP2018/012442.
Extended Search Report in corresponding European Application No. 18815497.5, dated Jun. 13, 2019.

* cited by examiner

*Fig.3*

| TAG ID | USER ID | SPOT ID | START TIME | END TIME | COMPLETION FLAG |
|---|---|---|---|---|---|
| A1 | B1 | C1 | 13:15 | 14:15 | 1 |
| A1 | B1 | C2 | 14:15 | 16:00 | 1 |
| A1 | B1 | C3 | 16:00 | 19:00 | 0 |
| A2 | B15 | C3 | 14:00 | 19:00 | 0 |
| A3 | B20 | C5 | 10:00 | 12:10 | 1 |
| A3 | B20 | C15 | 12:10 | 18:00 | 1 |
| A3 | B20 | C20 | 18:00 | 19:00 | 0 |
| | | | | | |
| | | | | | |
| | | | | | |
| | | | | | |
| | | | | | |
| | | | | | |
| | | | | | |
| | | | | | |

Fig.4

| DATE | TIME | C1 | C2 | ... | C10 | ... |
|---|---|---|---|---|---|---|
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |
| ... | ... | .../... | .../... | .../... | .../... | .../... |

112

LUGGAGE STORAGE SYSTEM AND LUGGAGE MANAGEMENT METHOD

CROSS-REFERENCE TO RELATED APPLICATIONS

This application is a continuation application of PCT Application No. PCT/JP2018/012442, filed Mar. 27, 2018, which claims the benefit of priority from Japanese Patent Application No. 2017-211976, filed Nov. 1, 2017, the entire contents of which are incorporated herein by reference.

FIELD

The present disclosure relates to a luggage storage system and a luggage management method.

BACKGROUND

Japanese Unexamined Patent Publication No. 2015-219629 discloses a locker including a structure including a plurality of reception portions for receiving articles, and a housing that stores the structure. The structure is configured to be freely put in and taken out of the housing and is configured to be freely movable. According to this locker, it is possible to move luggage stored in one locker to another locker.

SUMMARY

Disclosed herein is an example luggage storage system. The luggage storage system may include a tag attached to a luggage, a plurality of storage spot terminals installed in a plurality of storage spots each including a movable spot, a database that stores information on stored luggage, and a circuitry. The circuitry may be configured to acquire identification information of the tag and identification information of a user from a mobile terminal that has read the identification information of the tag attached to the luggage at the time of depositing the luggage and register the identification information of the tag and the identification information of the user in the database in association with each other. Additionally, the circuitry further may be configured to acquire the identification information of the tag and identification information of the storage spot from the storage spot terminal that has read the identification information of the tag and register the identification information of the tag and the identification information of the storage spot in the database in association with each other. Still further, the circuitry may be configured to acquire the identification information of the tag and the identification information of the user from the mobile terminal that has read the tag at the time of receipt of the luggage and determine whether or not to return the luggage based on whether or not the identification information of the tag and the identification information of the user are associated with each other in the database.

Additionally, a luggage management method is disclosed herein. The luggage management method may be executed by a server for management of stored luggage. The luggage management method may include acquiring identification information of a tag attached to a luggage and identification information of a user from a mobile terminal that has read the identification information of the tag at the time of depositing the luggage and registering the identification information of the tag and the identification information of the user in a database in association with each other. Additionally, the luggage management method may include acquiring the identification information of the tag and identification information of a storage spot from a storage spot terminal that has read the identification information of the tag and registering the identification information of the tag and the identification information of the storage spot in the database in association with each other. Still further, the luggage management method may include acquiring the identification information of the tag and the identification information of the user from the mobile terminal that has read the tag at the time of receipt of the luggage and determining whether or not the luggage may be returned based on whether or not the identification information of the tag and the identification information of the user are associated in the database.

BRIEF DESCRIPTION OF THE DRAWINGS

FIG. 3 is a table illustrating storage content of an example stored luggage database.

FIG. 4 is a table illustrating storage content of an example spot position database.

DETAILED DESCRIPTION

Figure 1:
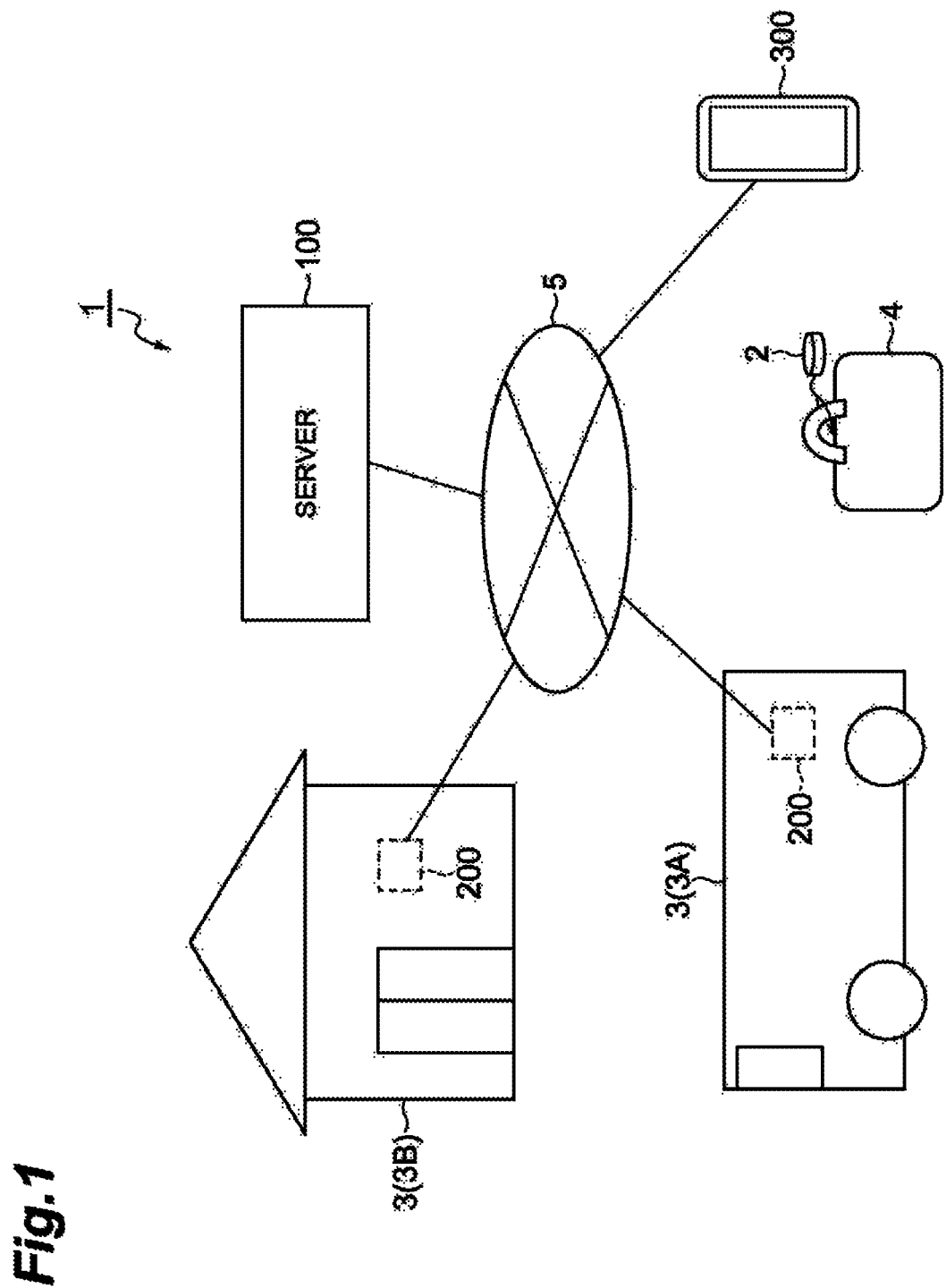
FIG. 1 is a schematic diagram illustrating an example configuration of a luggage storage system.

Hereinafter, embodiments will be described in detail with reference to the drawings. In the description, the same elements or elements having the same function are denoted by the same reference numerals, and redundant description will be omitted.

Luggage Storage System

An example luggage storage system 1 illustrated in FIG. 1 may be configured to provide a temporary luggage storage service to users who desire to reduce a burden of carrying luggage, such as travelers, shoppers, or guests of amusement facilities (for example, theme parks). In some examples, the luggage storage system 1 provides a service of receiving luggage from a user at any one of a plurality of storage spots registered in advance and performing return of the luggage to the user at any one of the plurality of storage spots. The luggage storage system 1 includes a tag 2 to be attached to luggage 4, a plurality of storage spot terminals 200 installed at a plurality of storage spots 3, and a server 100.

The tag 2 (or a luggage tag) holds a tag identifier which includes identification information in a format that can be read by a mobile terminal 300 of a user of the luggage storage system 1, and can be attached to or detached from the luggage 4. Illustrative examples of the tag 2 include an IC tag that holds identification information as electronic data, a marker that holds identification information as image information such as a two-dimensional bar code, and a magnetic chip that holds identification information as magnetic data.

The mobile terminal 300 (or a hand-held mobile terminal) may be configured for wired or wireless network communication. Illustrative examples of the mobile terminal 300 include a laptop computer, a tablet computer, and a smartphone. The mobile terminal 300 includes an application for the user of the luggage storage system 1. The application may be a network browser or a dedicated application installed for the luggage storage system 1.

The storage spots 3 have a space configured to accommodate the luggage 4. The plurality of storage spots 3 include movable spots 3A (or mobile luggage storage). A movable spot can be moved by the power of the movable spot (i.e., self-powered). An example of the movable spot 3A may include a vehicle such as a truck. The movable spot 3A may include a flying body such as a drone. The plurality of storage spots 3 may include a fixed spot 3B (or a fixed luggage storage), in addition to the movable spot 3A. An example of the fixed spot 3B may include a predetermined space in a building such as a store.

The storage spot terminal 200 is installed in the storage spot 3. If the storage spot 3 is the movable spot 3A, the storage spot terminal 200 is a mobile storage terminal. If the storage spot 3 is the fixed spot 3B, the storage spot terminal 200 is a fixed storage terminal. The storage spot terminal 200 may be configured to perform wired or wireless network communication. Illustrative examples of the storage spot terminal 200 may include a desktop computer, a laptop computer, a tablet computer, and a smartphone. The storage spot terminal 200 includes an application for an administrator of the storage spot 3. The application may be a network browser or a dedicated application installed for the luggage storage system 1.

The server 100 is connected to the storage spot terminal 200 and the mobile terminal 300 via a network 5 (for example, the Internet), and performs information processing for providing the luggage storage service. For example, the server 100 is configured to acquire the identification information of the tag 2 and the identification information of the user from the mobile terminal 300 that has read the identification information of the tag 2 attached to the luggage 4 at the time of depositing the luggage 4 and register the tag identifier including the identification information of the tag 2 and a user identifier including the identification information of the user in the database in association with each other. Additionally, the server 100 may be configured to acquire the identification information of the tag 2 and the identification information of the storage spot 3 from the storage spot terminal 200 that has read the identification information of the tag 2 and register the identification information of the tag 2 and the identification information of the storage spot 3 in the database in association with each other. Still further, the server 100 may be configured to acquire the identification information of the tag 2 and the identification information of the user from the mobile terminal 300 that has read the tag 2 at the time of receipt of the luggage 4 and determine whether or not to return the luggage 4 based on whether or not the identification information of the tag 2 and the identification information of the user are associated in the database. Still further, the server 100 may be configured to acquire the user identifier from the mobile terminal 300 in response to reading of the tag 2 by the mobile terminal 300. Still further, the serve 100 may be configured to acquire a luggage release request from the mobile terminal 300 in response to rescanning of the tag 2 by the mobile terminal 300. Still further, the server 100 may be configured to acquire a current position information of the storage spot 3 from the storage spot terminal. The server 100 may be configured to transmit the current position information to the mobile terminal 300.

Figure 2:
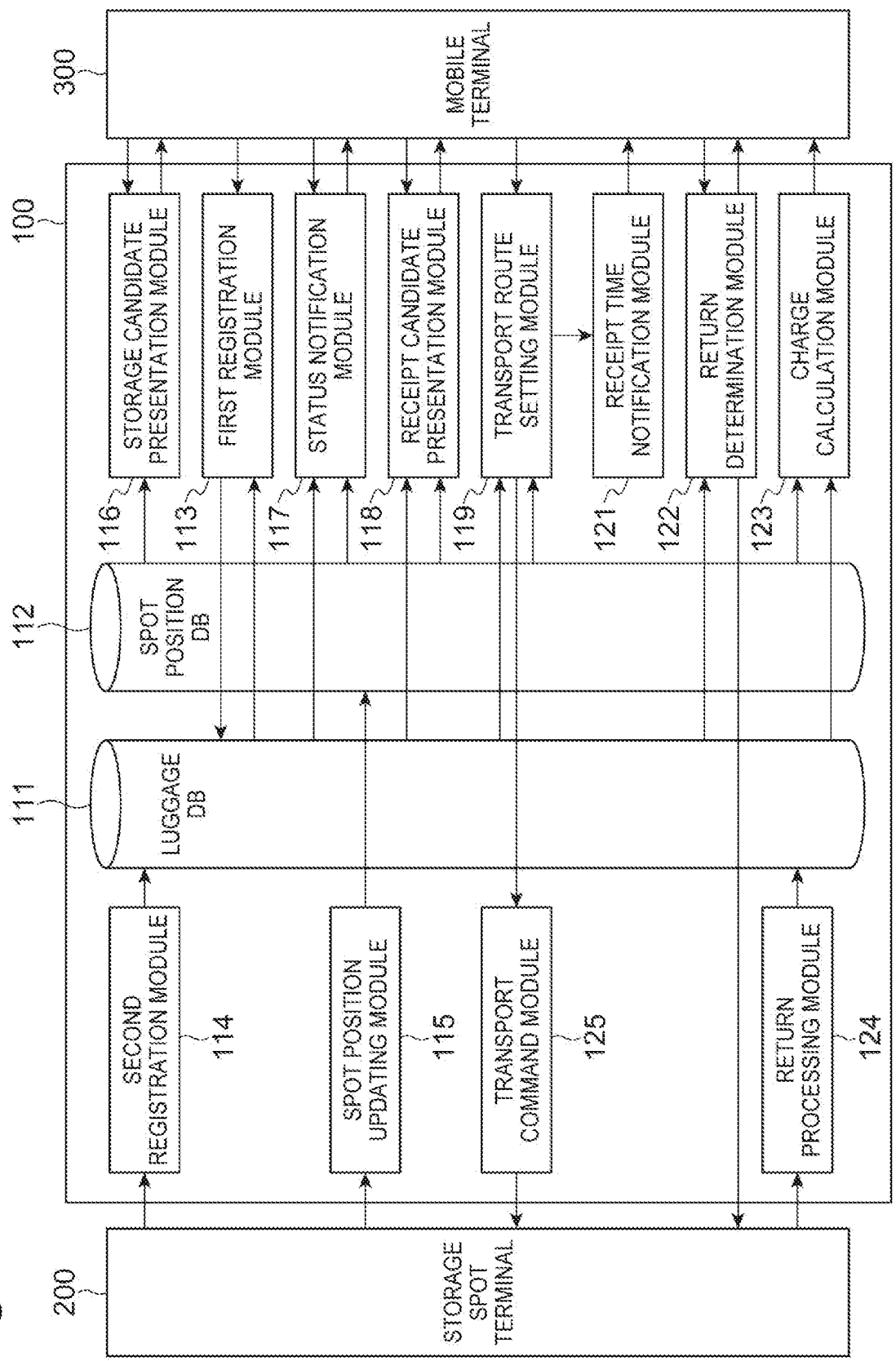
FIG. 2 is a block diagram illustrating an example functional configuration of a server.

FIG. 2 is a block diagram illustrating an example functional configuration of the server 100. As illustrated in FIG. 2, the server 100 includes a luggage database 111, a spot position database 112, a first registration module 113, a second registration module 114, a spot position updating module 115, a deposit candidate presentation module 116, a status notification module 117, a receipt candidate presentation module 118, a transport route setting module 119, a receipt time notification module 121, a transport command module 125, a return determination module 122, a fee calculation module 123, and a return processing module 124 as functional components (hereinafter referred to as "functional modules").

The luggage database 111 stores information on the luggage 4 that is a storage target. For example, the luggage database 111 stores the identification information (tag ID) of the tag 2 attached to the luggage 4, an identification code (user ID) of the user of the storage service of the luggage 4, an identification code (spot ID) of the storage spot 3 of the luggage 4, a storage start time of the luggage 4 in the storage spot 3, a storage end time of the luggage 4 in the storage spot 3, and a completion flag of the storage service of the luggage 4 in association with each other, as illustrated in FIG. 3. The completion flag indicates whether or not the luggage 4 is being stored. In FIG. 3, the completion flag of 1 indicates that the storage has ended, and the completion flag of 0 indicates that the storage is under way or continuing (e.g., has not ended).

Figure 4:
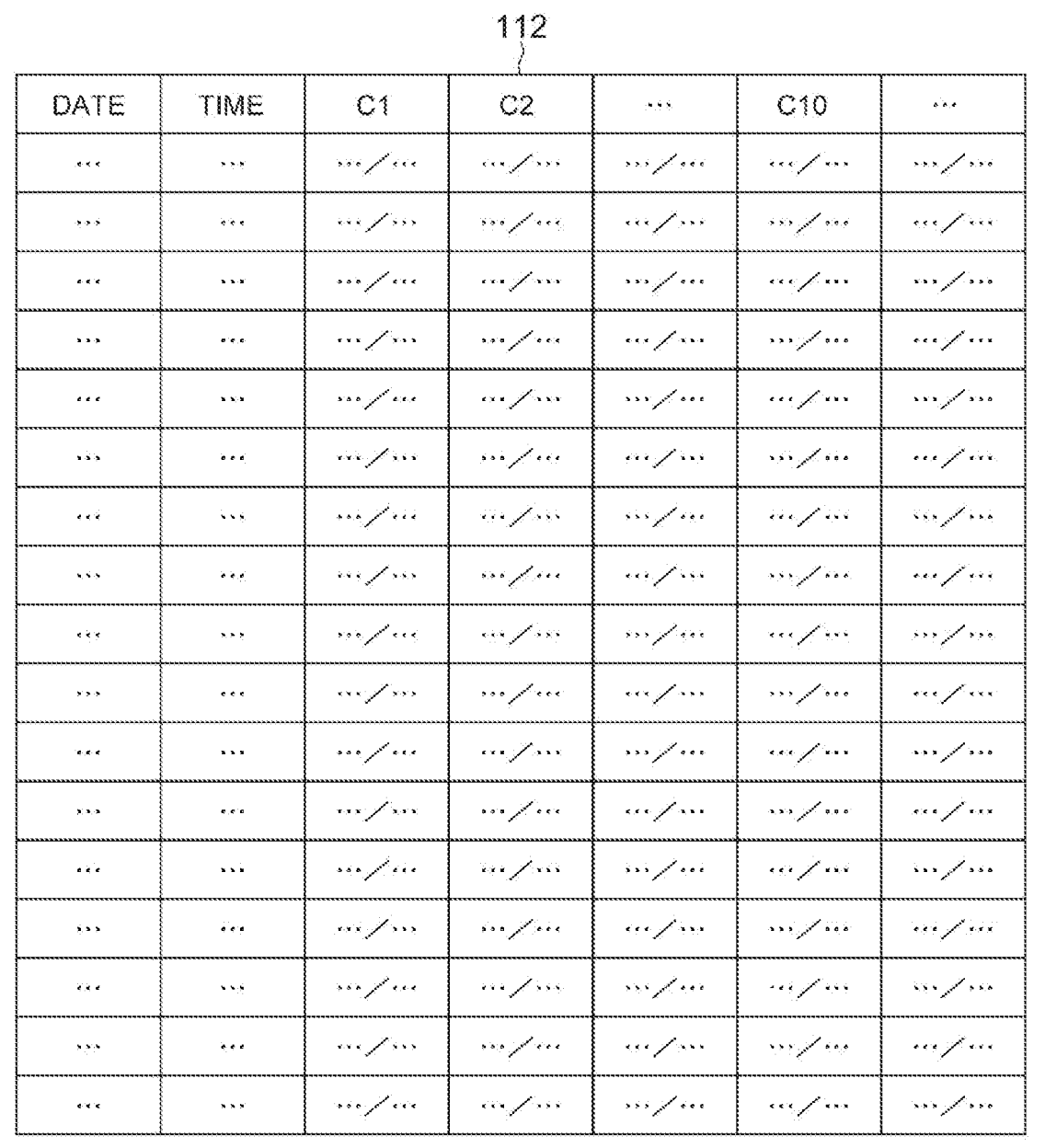

The spot position database 112 stores position information of the storage spot 3. For example, the spot position database 112 stores date and time and position information (for example, latitude and longitude) of each storage spot 3 in association with each other, as illustrated in FIG. 4.

Referring back to FIG. 2, the first registration module 113 acquires the identification information of the tag 2 and the identification information of the user from the mobile terminal 300 that has read the identification information of the tag 2 attached to the luggage 4 at the time of depositing the luggage 4 and registers the identification information of the tag 2 and the identification information of the user in the luggage database 111 in association with each other. A user identifier may include the identification information of the user. The first registration module 113 also changes the identification information of the user in the luggage database 111 according to an input from the mobile terminal 300 after starting the storage of the luggage 4 and before return of the luggage 4. The second registration module 114 acquires the identification information of the tag 2 and the identification information of the storage spot 3 from the storage spot terminal 200 that has read the identification information of the tag 2, and registers the identification information of the tag 2 and the identification information of the storage spot 3 in the luggage database 111 in association with each other.

A mobile storage identifier may include the identification information of the storage spot 3.

The spot position updating module 115 repeats a process of acquiring current position information of each storage spot 3 from the storage spot terminal 200 and writing the current position information to the spot position database 112, at regular periods.

The deposit candidate presentation module 116 acquires current position information of the mobile terminal 300 from the mobile terminal 300 and transmits the current position information of the storage spot 3 in a first reference area including a position indicated by the current position information of the mobile terminal 300 to the mobile terminal 300. The status notification module 117 acquires a request for transmission of current position information of the tag 2 from the mobile terminal 300, acquires the identification information of the current storage spot 3 associated with the identification information of the tag 2 from the luggage database 111, and transmits the current position information of the storage spot 3 to the mobile terminal 300. The receipt candidate presentation module 118 acquires desired position information for receipt of the luggage 4 from the mobile terminal 300 and transmits the current position information of the storage spot 3 in a predetermined area including the position indicated by the desired position information to the mobile terminal 300.

The transport route setting module 119 acquires a designation of the storage spot 3 for receipt of the luggage 4 (or a final destination) from the mobile terminal 300, acquires the identification information of the current storage spot 3 associated with the identification information of the tag 2 attached to the luggage 4 from the luggage database 111, and sets a transport route of the luggage 4 from the current storage spot 3 to a storage spot 3 for receipt. The transport route setting module 119 may acquire delivery request identifying a final destination from the mobile terminal 300. The transport route setting module 119 may set a position for reloading of the luggage between the storage spots 3 and transport routes of these storage spots 3 in accordance with the delivery request. The receipt time notification module 121 calculates a time at which the luggage 4 may be received in the storage spot 3. The transport command module 125 transmits a command to transport and reload the luggage 4 to the storage spot terminal 200 of each storage spot 3 included in the transport route set by the transport route setting module 119. The transport route setting module 119 may select two mobile luggage storages 3A as the first and second luggage storages in accordance with the transport route. In this case, the transport command module 125 may request, to the first and second storage terminals, a transfer of the luggage between the first and second luggage storages so that the luggage is redirected from a first transport route associated with the first luggage storage to a second transport route associated with the second luggage storage. Further, the transport route setting module 119 may select a mobile luggage storage 3A and a fixed luggage storage 3B as the first and second luggage storages in accordance with the transport route. In this case, the transport command module 125 may request, to the first and second storage terminals, a transfer of the luggage between the first luggage storage and the second luggage storage so that the luggage is delivered to the second luggage storage.

The return determination module 122 acquires the identification information of the tag 2 and the identification information of the user from the mobile terminal 300 that has read the tag at the time of receipt of the luggage and determines whether or not to return the luggage 4 based on whether or not the identification information of the tag 2 and the identification information of the user are associated with each other in the luggage database Ill. For example, the return determination module 122 may acquire, from the mobile terminal 300, a luggage release request with the user identifier. The return determination module 122 may authorize a release of the luggage associated with the luggage tag upon verifying that the user identifier acquired with the luggage release request is associated with the tag identifier in the luggage database 111. The fee calculation module 123 calculates an elapsed time from a deposit time (or a time of deposit) to a receipt time (or a time of release) of the luggage 4 and a movement distance (or a delivery distance) from the deposit time to the receipt time of the luggage 4, and calculates a use fee of the luggage storage service based on the elapsed time and the movement distance. In some examples, the fee calculation module 123 may calculate the use fee based on any one of the elapsed time and the movement distance. The return processing module 124 updates the content of the luggage database 111 according to the return of the luggage 4. For example, the return processing module 124 acquires a request for update of the luggage database 111 from the storage spot terminal 200 of the storage spot 3 which has completed the return of the luggage 4, and changes the completion flag of the luggage 4 in the storage spot 3 to 1.

Figure 5:
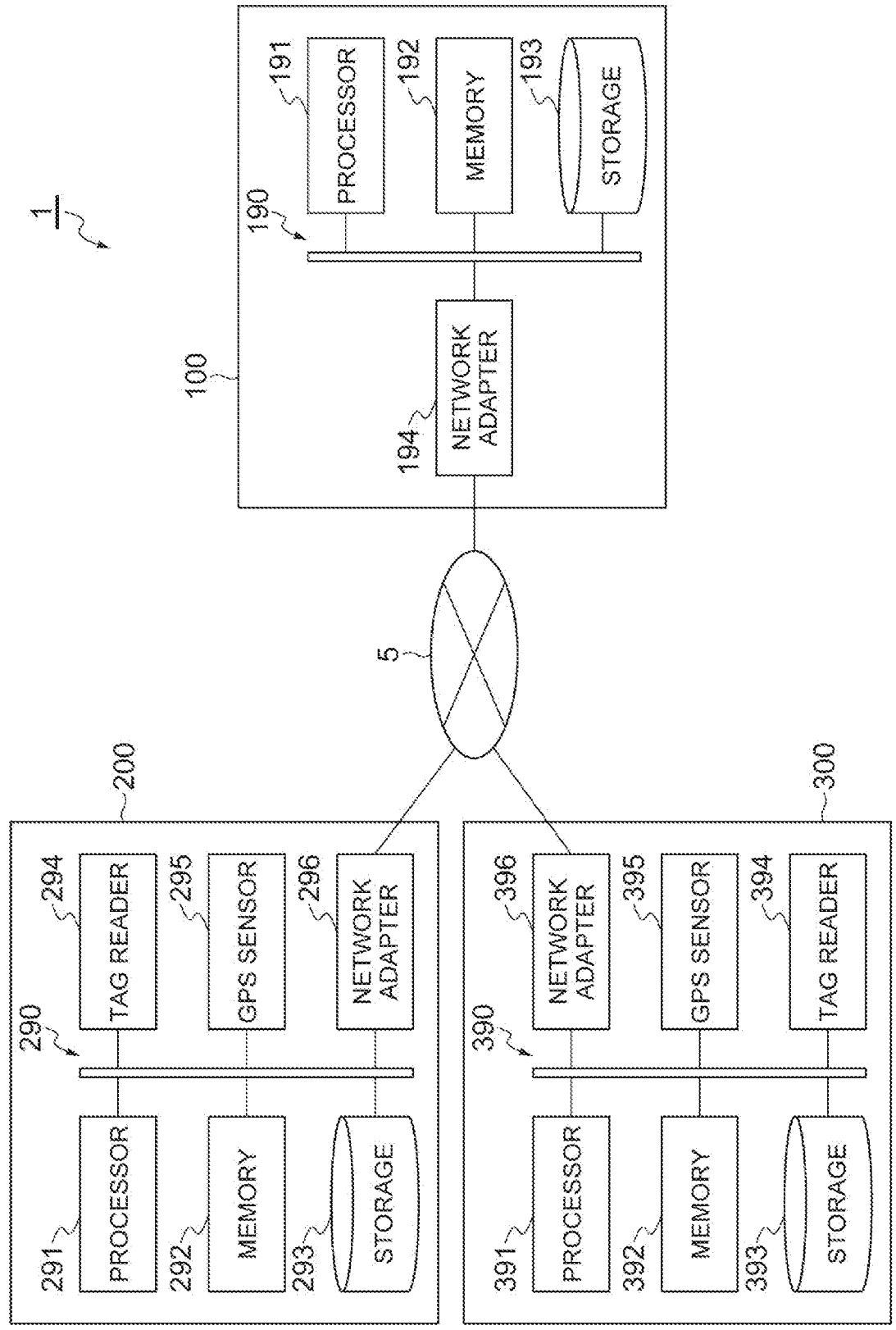
FIG. 5 is an example hardware configuration diagram illustrating a server, a storage spot terminal, and a mobile terminal.

FIG. 5 is a diagram illustrating a hardware configuration of the server 100, the storage spot terminal 200, and the mobile terminal 300. As illustrated in FIG. 5, the server 100 includes circuitry 190. The circuitry 190 includes a processor 191, a memory 192, a storage 193, and a network adapter 194. The processor 191 executes information processing for providing the luggage storage service. The processor 191 may be packaged as one electronic component or may include a plurality of separately packaged electronic components. The storage 193 is, for example, a storage medium such as at least one hard disk or a nonvolatile memory, and stores a program and data for providing the luggage storage service. The memory 192 is, for example, a random access memory, and temporarily stores data for information processing of the processor 191. The network adapter 194 is connected to the network 5 in a wired or wireless manner, and performs input and output of information with the network 5 in response to a command from the processor 191.

The storage spot terminal 200 includes circuitry 290. The circuitry 290 includes a processor 291, a memory 292, a storage 293, a tag reader 294, a GPS sensor 295, and a network adapter 296. The processor 291 cooperates with the server 100 to execute information processing for managing the luggage 4. The processor 291 may be packaged as one electronic component or may include a plurality of separately packaged electronic components. The storage 293 is, for example, a storage medium such as at least one hard disk or nonvolatile memory, and stores data and a program including the application for an administrator described above. The memory 292 is, for example, a random access memory, and temporarily stores data for information processing of the processor 291. The tag reader 294 reads the identification information held by the tag 2. Illustrative examples of the tag reader 294 may include an IC tag reader, a camera, and a magnetic reader. The GPS sensor 295 receives a satellite signal for a global positioning system (GPS). The network adapter 296 is connected to the network 5 in a wired or wireless manner, and performs input and output of information to and from the network 5 in response to a command from the processor 291.

The mobile terminal 300 has circuitry 390. The circuitry 390 includes a processor 391, a memory 392, a storage 393, a tag reader 394, a GPS sensor 395, and a network adapter 396. The processor 391 executes information processing for using the luggage storage service. The processor 391 may be packaged as one electronic component or may include a plurality of separately packaged electronic components. The storage 393 is, for example, a storage medium such as at least one hard disk or nonvolatile memory, and stores a program including the application for a user described above and data. The memory 392 is, for example, a random access memory, and temporarily stores data for information processing of the processor 391. The tag reader 394 reads the identification information held by the tag 2. Illustrative examples of the tag reader 394 may include an IC tag reader, a camera, and a magnetic reader. The GPS sensor 395 receives the satellite signal for a GPS. The network adapter 396 is connected to the network 5 in a wired or wireless manner, and performs input and output of information to and from the network 5 in response to a command from the processor 391. The storage 393 may have instructions stored thereon that, in response to execution by the mobile terminal 300, cause the mobile terminal 300 to perform operations comprising: scanning the tag 2 to be attached to the luggage 4; transmitting, to the server 100 for management of stored luggage 4, a tag identifier including identification information of the tag 2 in response to scanning of the tag 2; acquiring, from the server 100, a current position information of the movable spot 3A storing the luggage 4; and displaying a current position of the movable spot 3A based on the current position information. The operations may further include: rescanning the tag 2 attached to the luggage 4; and transmitting, to the server 100, the tag identifier in response to rescanning of the tag 2 for verification that a user of the mobile terminal 300 is associated with the tag identifier in the server 100. The operations may further include: transmitting, to the server 100, both the tag identifier and user identification information to verify the user of the mobile terminal 300.

Method of Providing Luggage Storage Service

Subsequently, a method of providing a luggage storage service that is executed using the luggage storage system 1 will be illustrated. The method of providing the luggage storage service includes a luggage management method that is executed by the server 100. The luggage management method includes acquiring the identification information of the tag 2 and the identification information of the user from the mobile terminal 300 that has read the identification information of the tag 2 attached to the luggage 4 at the time of depositing the luggage 4 and registering the identification information of the tag 2 and the identification information of the user in the luggage database 111 in association with each other. Additionally, the luggage management method may include acquiring the identification information of the tag 2 and the identification information of the storage spot 3 from the storage spot terminal 200 that has read the identification information of the tag 2, and registering the identification information of the tag 2 and the identification information of the storage spot 3 in the luggage database 111 in association with each other. Still further, the luggage management method may include acquiring the identification information of the tag 2 and the identification information of the user from the mobile terminal 300 that has read the tag 2 at the time of receipt of the luggage 4 and determining whether or not to return the luggage 4 based on whether or not the identification information of the tag 2 and the identification information of the user are associated with each other in the luggage database 111.

As an example, the method of providing the luggage storage service includes an information presentation procedure for a storage candidate spot, a procedure for registering deposited luggage, a procedure for updating position information of a storage spot, and a procedure for changing the storage spot. Additionally, the method of providing the luggage storage service may include an information presentation procedure for a current position of the luggage, a procedure for changing a user associated with the deposited luggage, a procedure of setting the storage spot for receipt, and a return process procedure for the deposited luggage. Each example procedure will be illustrated in further detail below.

Information Presentation Procedure for Deposit Candidate Spot

Figure 6:
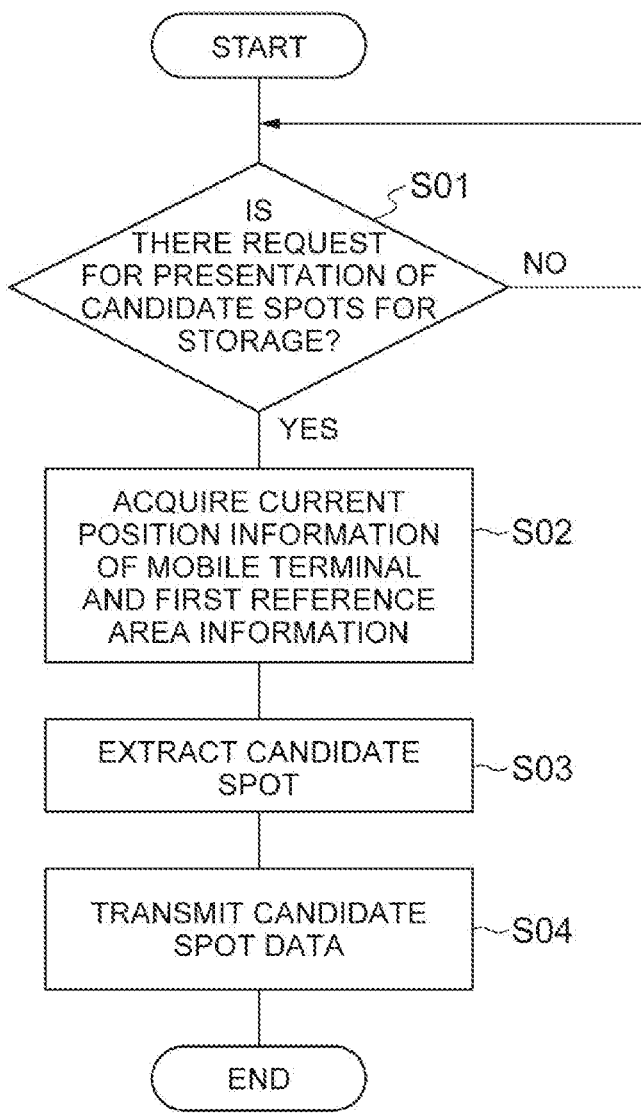
FIG. 6 is a flowchart illustrating an example information presentation procedure for a deposit candidate spot.

As illustrated in FIG. 6, the server 100 may sequentially execute steps S01, S02, S03, and S04. In step S01, the deposit candidate presentation module 116 waits for the mobile terminal 300 to request presentation of candidate spots for deposit. In step S02, the deposit candidate presentation module 116 acquires the current position information of the mobile terminal 300 and the information on the first reference area including the position indicated by the current position information from the mobile terminal 300. For example, when the mobile terminal 300 is displaying a map of an area including the current position of the mobile terminal 300, the deposit candidate presentation module 116 acquires information defining the area displayed by the map as information on the first reference area. In step S03, the deposit candidate presentation module 116 extracts the storage spot 3 in the first reference area based on the latest position information stored in the spot position database 112.

In step S04, the deposit candidate presentation module 116 transmits the current position information of all storage spots 3 (hereinafter referred to as "candidate spots") extracted in step S03 to the mobile terminal 300. In some examples, the current position information need not be exactly the current information, but may be information in the past rather than a current time in a range in which the information can be regarded as substantially the same as the current information. The same also applies to the following. The range in which the information can be regarded as substantially the same as the current information means such a range that the user cannot recognize a difference. Therefore, the deposit candidate presentation module 116 may transmit the latest position information of the spot position database 112 to the mobile terminal 300 as the current position information of the candidate spot or may acquire the current position information from the storage spot terminal 200 of the candidate spot and transmit the current position information to the mobile terminal 300. The mobile terminal 300 that has received the current position information of all the candidate spots, for example, displays a mark of the candidate spot on the map. Then, the information presentation procedure of the deposit candidate spots is completed. The server 100 repeatedly executes this procedure.

Procedure for Registering Deposited Luggage

Figure 7:
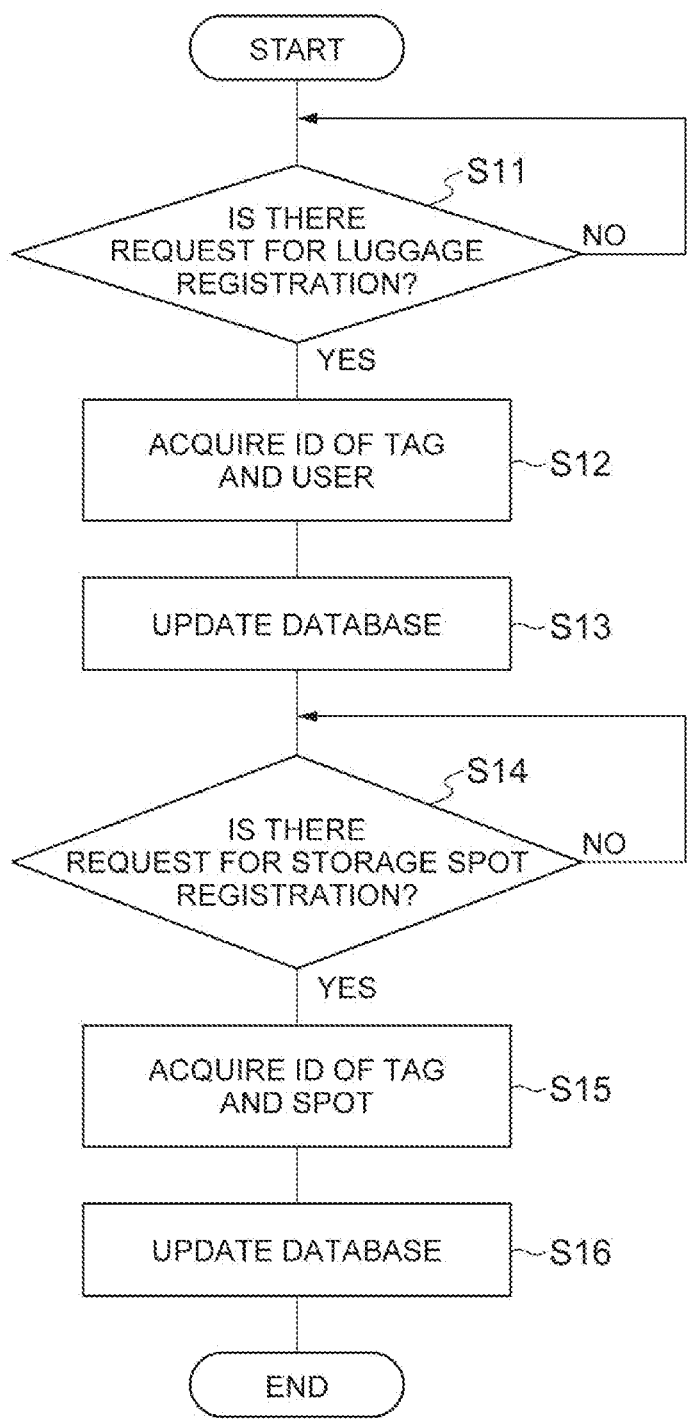
FIG. 7 is a flowchart illustrating an example registration procedure for deposited luggage.

As illustrated in FIG. 7, the server 100 may sequentially execute steps S11, S12, and S13. In step S11, the first registration module 113 waits for registration of the deposited luggage 4 to be requested from the mobile terminal 300. In step S12, the first registration module 113 acquires the identification information of the tag 2 and the identification information of the user from the mobile terminal 300 that has read the identification information of the tag 2 attached to the deposited luggage 4. The identification information of the user may include identification information of a user who is qualified for receipt of the luggage 4. For example, the identification information of the user may include identification information of a user who logs in to an application of the mobile terminal 300 or may include identification information of a user designated by an operator on the application of the mobile terminal 300. When the owner of the mobile terminal 300 is specified, the identification information of the user may include identification information of the mobile terminal 300 itself. In step S13, the first registration module 113 registers the identification information of the tag 2 and the identification information of the user acquired in step S12 in the luggage database 111 in association with each other.

Next, the server 100 may sequentially execute steps S14, S15 and S16 in order. In step S14, the second registration module 114 waits for registration of the storage spot 3 for the deposited luggage 4 to be requested from the storage spot terminal 200. In step S15, the second registration module 114 acquires the identification information of the tag 2 and the identification information of the storage spot 3 from the storage spot terminal 200 that has read the identification information of the tag 2 attached to the deposited luggage 4. The identification information of the storage spot 3 may include identification information of an administrator who logs in to an application of the storage spot terminal 200 or identification information of the storage spot terminal 200 itself. In step S16, the second registration module 114 registers the identification information of the tag 2 and the identification information of the storage spot 3 acquired in step S15 in the luggage database 111 in association with each other. For example, the second registration module 114 adds the identification information of the storage spot 3 acquired in step S15 to the combination of the identification information of the tag 2 and the identification information of the user registered in step S13. Then, the registration procedure for the deposited luggage 4 is completed. The server 100 repeatedly executes this procedure.

Procedure for Updating Position Information of Depositing Spot

Figure 8:
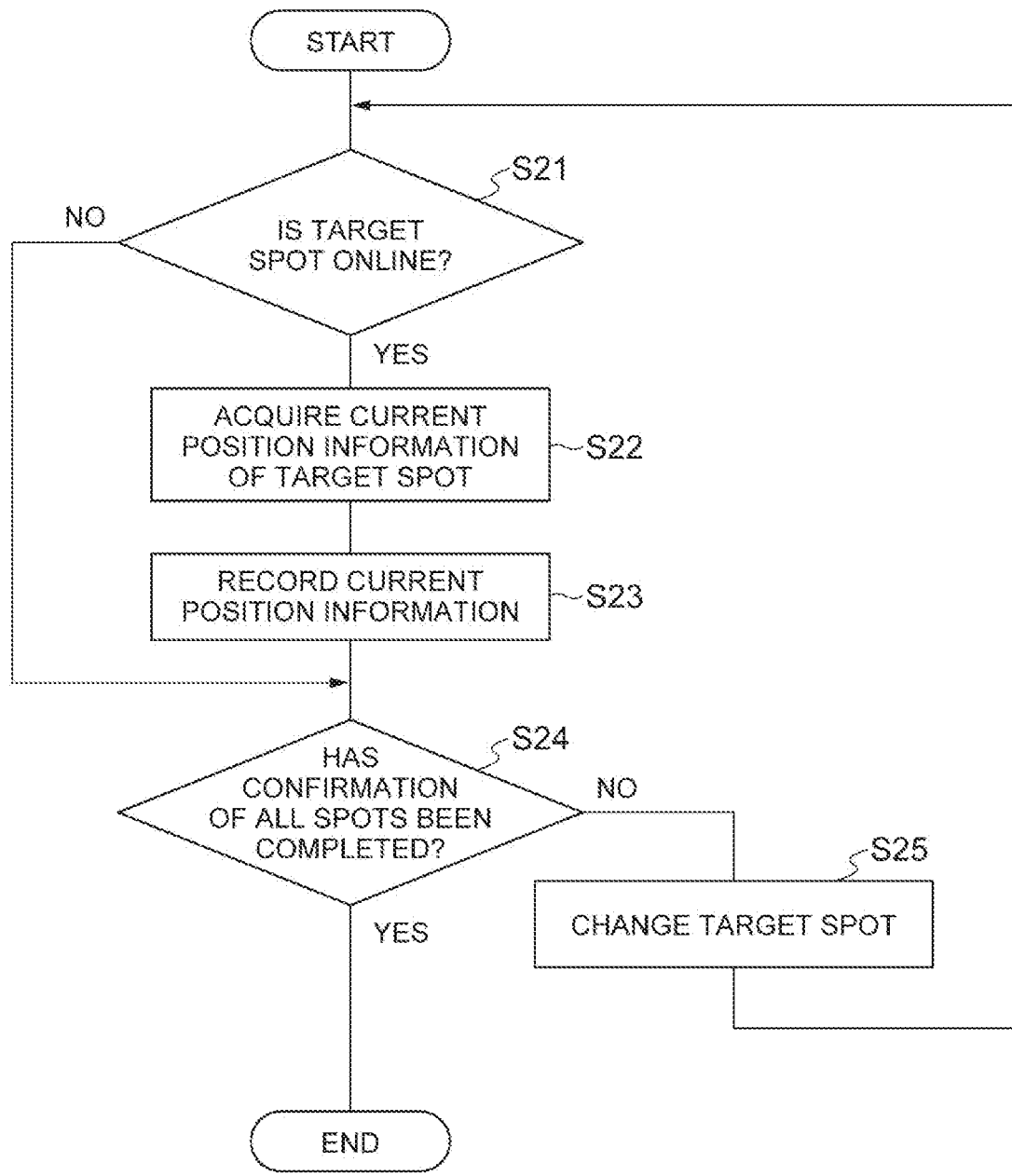
FIG. 8 is a flowchart illustrating an example procedure for updating position information of storage spots.

As illustrated in FIG. 8, the server 100 may first execute step S21. In step S21, the spot position updating module 115 confirms whether or not the storage spot terminal 200 of the storage spot 3 of which the position information is to be updated (hereinafter referred to as a "target spot") is online (whether or not the storage spot terminal 200 is connected to the network 5).

When it is determined in step S21 that the storage spot terminal 200 is online, the server 100 may execute steps S22 and S23 in order. In step S22, the spot position updating module 115 acquires the current position information of the target spot from the storage spot terminal 200. In step S23, the spot position updating module 115 records a current date and time and the current position information of the target spot in the spot position database 112 in association with each other.

When it is determined in step S21 that the storage spot terminal 200 is offline (is not connected to the network 5), the server 100 may execute step S24 without executing steps S22 and S23. In step S24, the spot position updating module 115 determines whether or not confirmation of the current position information of all the storage spots 3 has been completed.

When it is determined in step S24 that the storage spots 3 of which the current position information is not confirmed remains, the server 100 executes step S25. In step S25, the spot position updating module 115 changes the target spot. For example, the spot position updating module 115 selects any storage spot 3 of which the current position information is not confirmed, and sets the storage spot 3 as the next target spot. Thereafter, the server 100 returns to the process of step S21. Thereafter, the change of the target spot and the acquisition of the current position information of the target spot are repeated until confirmation of the current position information of all storage spots 3 is completed.

When it is determined in step S24 that confirmation of the current position information of all the storage spots 3 has been completed, the server 100 completes updating the position information of the storage spots 3. The server 100 repeatedly executes the above procedure at regular periods. Accordingly, the current position information of each storage spot 3 is updated at regular periods.

Procedure for Changing Storage Spot

Figure 9:
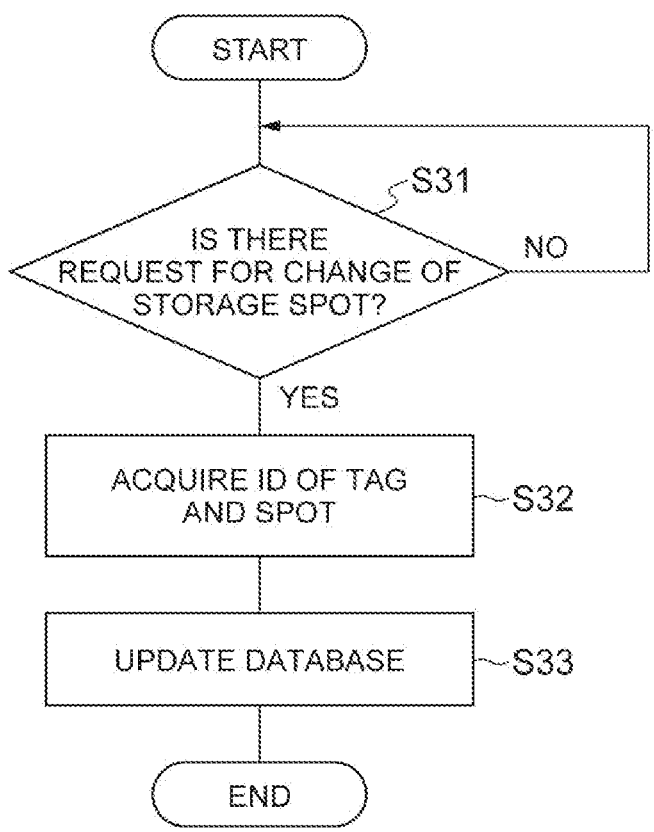
FIG. 9 is a flowchart illustrating an example procedure for changing a storage spot.

As illustrated in FIG. 9, the server 100 may execute steps S31, S32, and S33 in order. In step S31, the second registration module 114 waits for a change of the storage spot 3 to be requested from a storage spot terminal 200 of a storage spot 3 (hereinafter referred to as a "new spot") that takes over the stored luggage 4 from another storage spot 3 (hereinafter referred to as an "old spot"). In step S32, the second registration module 114 acquires the identification information of the tag 2 and the identification information of the new spot from the storage spot terminal 200 of the new spot that has read the identification information of the tag 2 attached to the stored luggage 4. In step S33, the second registration module 114 registers the identification information of the tag 2 and the identification information of the takeover spot acquired in step S32 in the luggage database 111 in association with each other. For example, the second registration module 114 changes combination data of the identification information of the tag 2, the identification information of the user, and the identification information of the old spot from a storing state (a state in which the completion flag is 0) to a returned state (a state in which the completion flag is 1), and newly registers combination data of the identification information of the tag 2, the identification information of the user, and the identification information of the new spot in the storing state. Then, the procedure of changing the storage spot 3 is completed. The server 100 repeatedly executes this procedure.

Information Presentation Procedure for Current Position of Luggage

Figure 10:
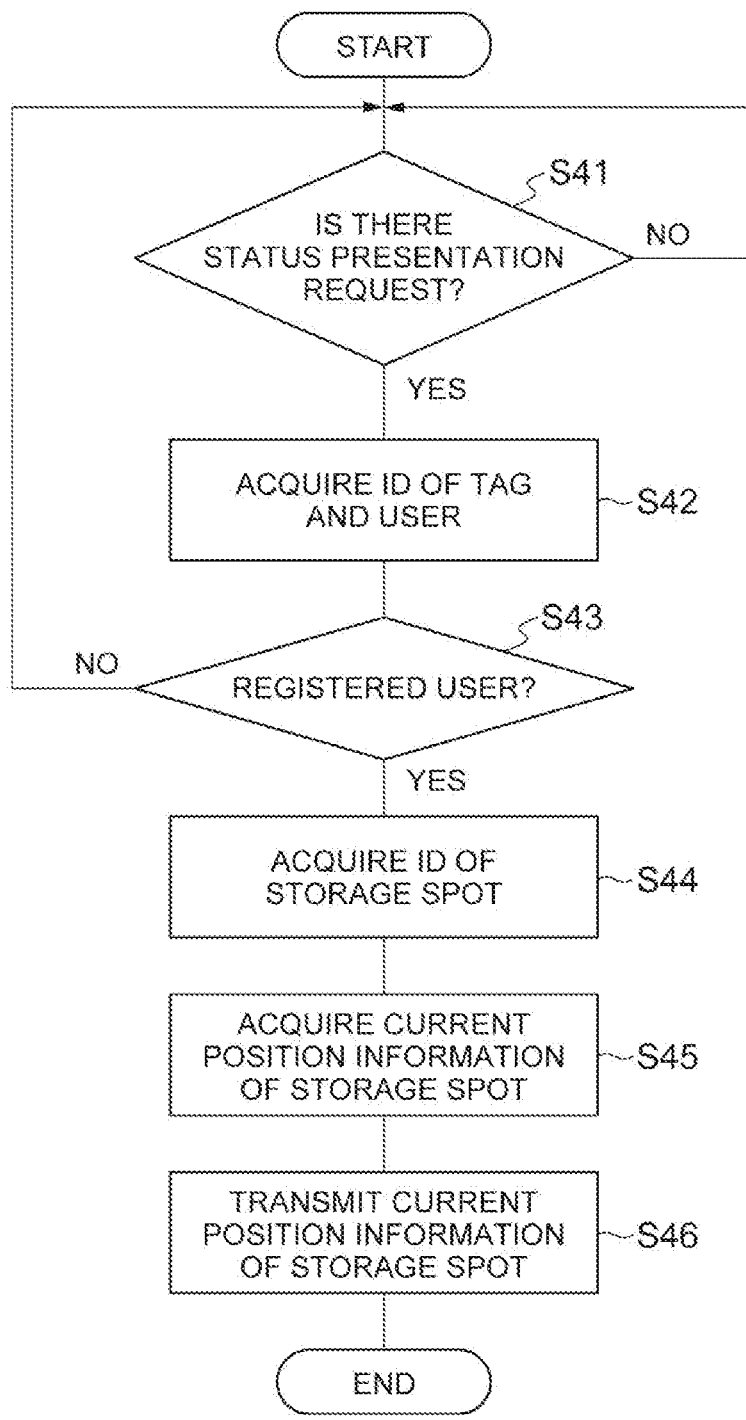
FIG. 10 is a flowchart illustrating an example procedure for presenting information on a current position of luggage.

As illustrated in FIG. 10, the server 100 may sequentially execute steps S41, S42, and S43. In step S41, the status notification module 117 waits for the mobile terminal 300 to request presentation of the current position information of the luggage 4. In step S42, the status notification module 117 acquires the identification information of the tag 2 attached to the luggage 4 that is a current position information presentation target and the identification information of the user from the mobile terminal 300. In step S43, the status notification module 117 confirms whether or not the identification information of the tag 2 and the identification information of the user acquired in step S42 are associated with each other in the luggage database 111. The identification information of the tag 2 and the identification information of the user being associated with each other in the luggage database 111 means that combination data of the identification information of the tag 2 and the identification information of the user is stored in the luggage database 111 in the storing state (a state in which the completion flag is 0). In step S43, when it is determined that the identification information of the tag 2 and the identification information of the user are not associated with each other in the luggage database 111, the server 100 returns to the process of step S41.

When it is determined in step S43 that the identification information of the tag 2 and the identification information of the user are associated with each other in the luggage database 111, the server 100 may sequentially execute steps S44, S45, and S46 in order. In step S44, the status notification module 117 acquires the identification information of the storage spot 3 in which the luggage 4 that is a current position information presentation target is being stored (hereinafter referred to as a "storing spot") from the luggage database 111. For example, the status notification module 117 acquires identification information of the storing spot from the data in the storing state (the state in which the completion flag is 0) among a combination of data of the identification information of the tag 2 attached to the luggage 4 and the identification information of the user. In step S45, the status notification module 117 acquires the current position information of the storing spot from the spot position database 112. For example, the status notification module 117 acquires the latest position information associated with the storing spot in the spot position database 112. In some examples, the status notification module 117 may acquire the current position information of the storing spot from the storage spot terminal 200 of the storing spot. In step S46, the status notification module 117 transmits the current position information of the depositing spot to the mobile terminal 300. Then, the information presentation procedure for the current position of the luggage is completed. The server 100 repeatedly executes this procedure.

Procedure for Changing User Associated with Stored Luggage

Figure 11:
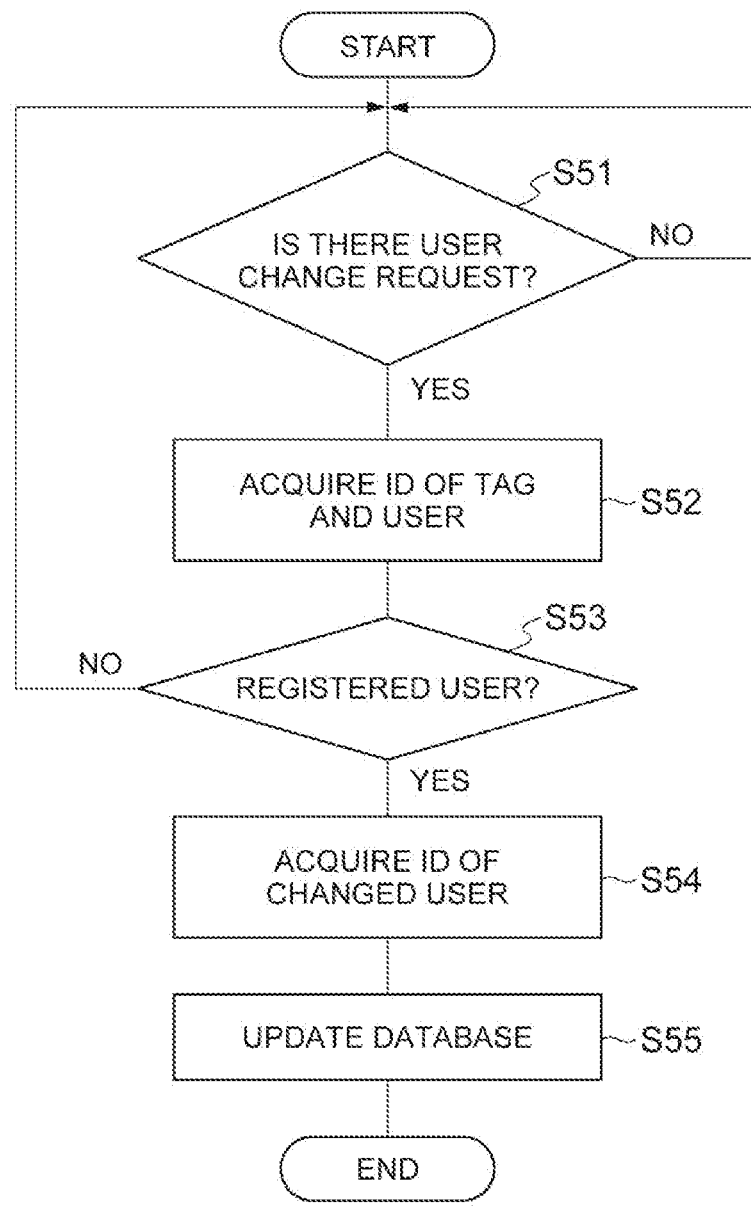
FIG. 11 is a flowchart illustrating an example procedure for changing a user associated with stored luggage.

As illustrated in FIG. 11, the server 100 may sequentially execute steps S51, S52, and S53. In step S51, the first registration module 113 waits for change of the user associated with the stored luggage 4 (the user associated with the tag 2 attached to the luggage 4) to be requested from the mobile terminal 300. In step S52, the storage candidate presentation module 116 acquires the identification information of the tag 2 attached to the luggage 4 that is a user change target (hereinafter referred to as a "change target tag 2") and the identification information of the user (a user before the change) from the mobile terminal 300. In step S53, the first registration module 113 confirms whether or not the identification information of the tag 2 and the identification information of the user acquired in step S52 are associated with each other in the luggage database 111. When it is determined in step S53 that the identification information of the tag 2 and the identification information of the user are not associated with each other in the luggage database 111, the server 100 returns to the process of step S51.

When it is determined in step S53 that the identification information of the tag 2 and the identification information of the user are associated with each other in the luggage database 111, the server 100 may execute steps S54 and S55 in order. In step S54, the first registration module 113 acquires identification information of a new user from the mobile terminal 300. In step S55, the first registration module 113 updates the identification information of the user associated with the tag 2 that is a change target in the luggage database 111 with the identification information of the new user. For example, the first registration module 113 overwrites the identification information of the user included in the data in the storing state (the state in which the completion flag is 0) among the data including the identification information of the tag 2 that is a change target with the identification information of the new user. Then, the user change procedure is completed. The server 100 repeatedly executes this procedure.

Procedure for Setting Storage Spot for Receipt

Figure 12:
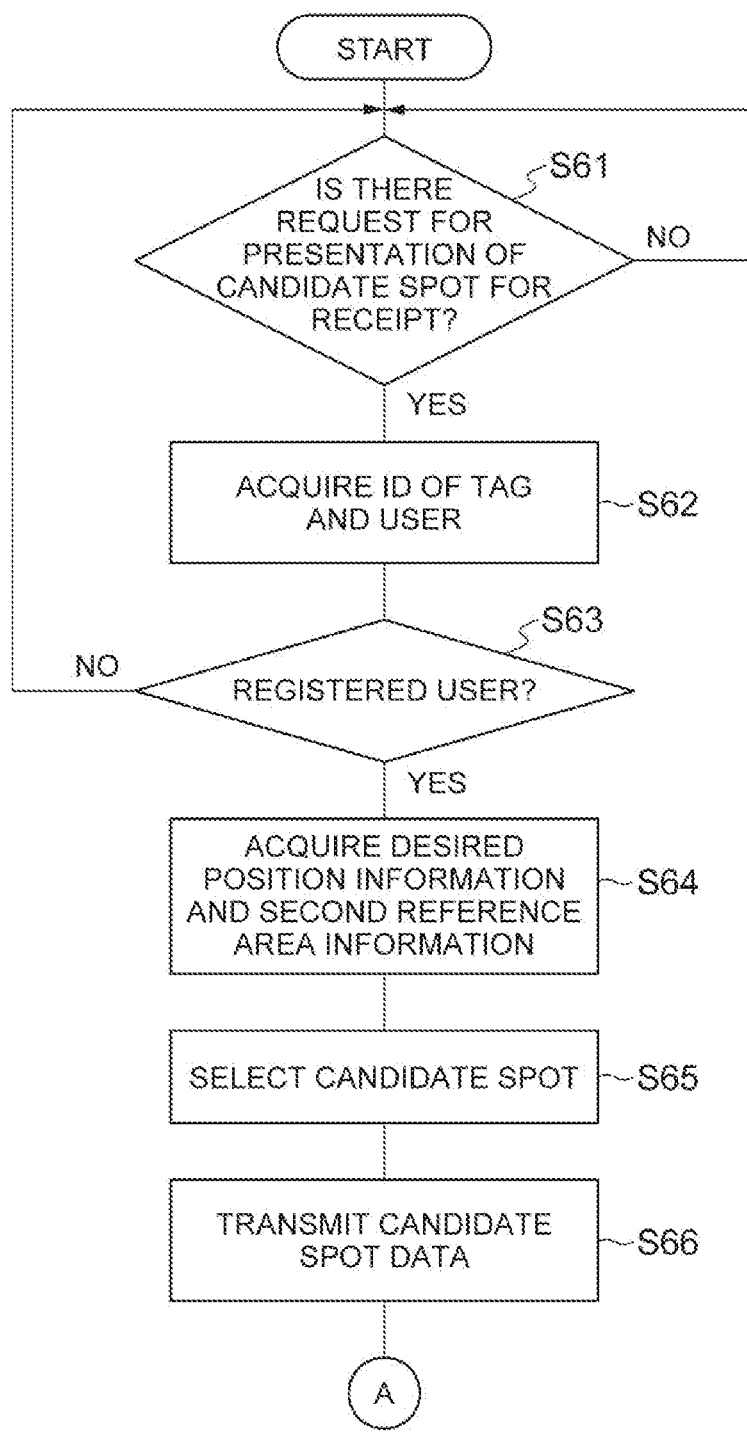
FIG. 12 is a flowchart illustrating an example procedure for setting a storage spot for receipt luggage.

As illustrated in FIG. 12, the server 100 may sequentially execute steps S61, S62, and S63. In step S61, the receipt candidate presentation module 118 waits for a presentation of candidate spots for receipt to be requested from the mobile terminal 300. In step S62, the receipt candidate presentation module 118 acquires the identification information of the tag 2 attached to the luggage 4 that is a receipt target (hereinafter referred to as "receipt target tag 2") and the identification information of the user from the mobile terminal 300. In step S63, the receipt candidate presentation module 118 confirms whether or not the identification information of the tag 2 and the identification information of the user acquired in step S62 are associated with each other in the luggage database 111. In step S63, when it is determined that the identification information of the tag 2 and the identification information of the user are not associated with each other in the luggage database 111, the server 100 returns to the process of step S61.

When it is determined in step S63 that the identification information of the tag 2 and the identification information of the user are associated with each other in the luggage database 111, the server 100 may sequentially execute steps S64, S65, and S66 in order. In step S64, the receipt candidate presentation module 118 acquires the desired position information for the receipt of the luggage 4 and information on a second reference area including a position indicated by the desired position information from the mobile terminal 300. For example, when the mobile terminal 300 displays a map of an area including a desired position for receipt of the luggage 4, the receipt candidate presentation module 118 acquires information defining the area displayed by the map as the information on a second reference area. In step S65, the receipt candidate presentation module 118 extracts the storage spot 3 in the second reference area based on the latest position information stored in the spot position database 112. In step S66, the receipt candidate presentation module 118 transmits the current position information of all storage spots 3 (hereinafter referred to as "candidate spots") extracted in step S65 to the mobile terminal 300. The receipt candidate presentation module 118 may transmit the latest position information of the spot position database 112 to the mobile terminal 300 as the current position information of the candidate spot or may acquire the current position information from the storage spot terminal 200 of the candidate spot and transmit the current position information to the mobile terminal 300. The mobile terminal 300 that has received the current position information of all the candidate spots, for example, displays a mark of the candidate spot on the map.

Figure 13:
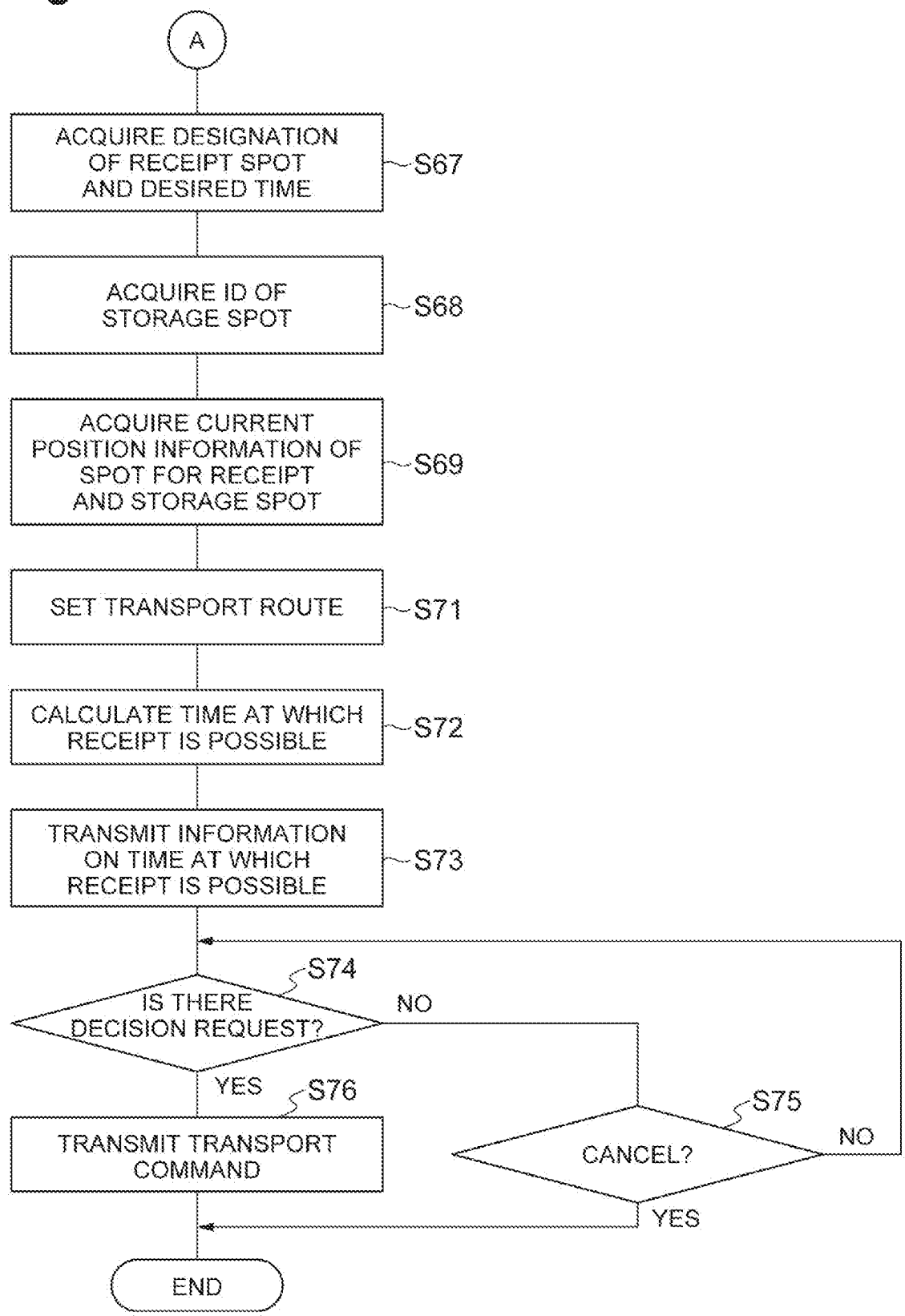
FIG. 13 is a flowchart illustrating an example procedure for setting a storage spot for receipt luggage.

As illustrated in FIG. 13, the server 100 may sequentially execute steps S67, S68, and S69. In step S67, the receipt candidate presentation module 118 acquires a designation of the storage spot 3 for receipt of the luggage 4 (hereinafter referred to as a "spot for receipt") and a desired receipt time from the mobile terminal 300. In step S68, the receipt candidate presentation module 118 acquires the identification information of the storage spot 3 in which the luggage 4 that is a receipt target is being stored (hereinafter referred to as a "storing spot") from the luggage database 111. In step S69, the receipt candidate presentation module 118 acquires the current position information of the storing spot from the spot position database 112.

Next, the server 100 may sequentially execute steps S71, S72, and S73 in order. In step S71, the transport route setting module 119 sets a transport route of the luggage 4 from the storing spot to the spot for receipt. The transport route includes a position at which the luggage 4 is reloaded between the storage spots 3 and a route on which each storage spot 3 moves the luggage 4. In step S72, the receipt time notification module 121 calculates a time at which the luggage 4 may be received in the spot for receipt based on the transport route set in step S71 (hereinafter referred to as a "set transport route"). In step S73, the receipt time notification module 121 transmits information on the time at which the luggage 4 may be received, which is calculated in step S72, to the mobile terminal 300.

In step S74, the transport route setting module 119 confirms whether or not decision of the set transport route is requested from the mobile terminal 300. In step S74, when it is determined that the decision of the set transport route is not requested, the server 100 executes step S75. In step S75, the transport route setting module 119 confirms whether or not cancellation of the set transport route is requested from the mobile terminal 300. In step S75, when it is determined that the cancellation of the set transport route is not requested, the server 100 returns to the process of step S74. Thereafter, the server 100 repeats the steps S74 and S75 until the decision or cancellation of the set transport route is requested.

When it is determined in step S74 that the decision of the set transport route is requested, the server 100 executes step S76. In step S76, the transport command module 125 transmits a command to transport and reload the luggage 4 to the storage spot terminal 200 of each storage spot 3 included in the set transport route. When it is determined in step S75 that the cancellation of the set transport route is requested, the server 100 may complete the process without executing step S76. Then, the procedure for setting the spot for receipt is completed. The server 100 repeatedly executes this procedure.

Return Process Procedure for Stored Luggage

Figure 14:
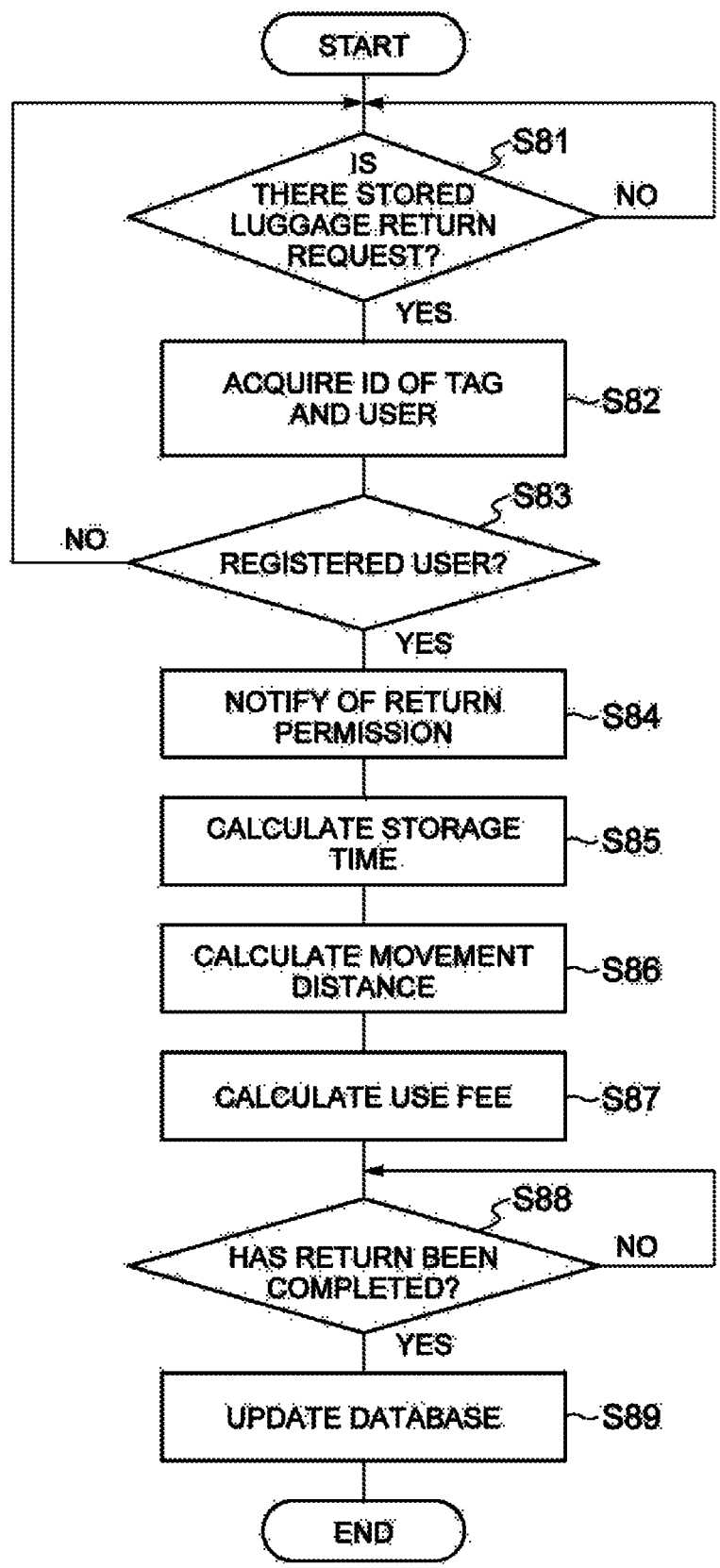
FIG. 14 is a flowchart illustrating an example return process procedure for stored luggage.

As illustrated in FIG. 14, the server 100 may sequentially execute steps S81, S82, and S83. In step S81, the return determination module 122 waits for receipt of the luggage 4 to be requested from the mobile terminal 300. In step S82, the return determination module 122 acquires the identification information of the tag 2 that is a receipt target (the tag 2 attached to the luggage 4 that is a receipt target) and the identification information of the user from the mobile terminal 300. In step S83, the return determination module 122 confirms whether or not the identification information of the tag 2 and the identification information of the user acquired in step S82 are associated with each other in the luggage database 111. In step S83, when it is determined that the identification information of the tag 2 and the identification information of the user are not associated with each other in the luggage database 111, the server 100 returns to the process of step S81.

In step S83, when it is determined that the identification information of the tag 2 and the identification information of the user are associated with each other in the luggage database 111, the server 100 executes step S84. In step S84, the return determination module 122 transmits a return permission notification to the mobile terminal 300 and the storage spot terminal 200. In some examples, the return determination module 122 may transmit the return permission notification to only one of the mobile terminal 300 and the storage spot terminal 200.

Next, the server 100 may sequentially execute steps S85, S86, and S87 in order. In step S85, the fee calculation module 123 calculates an elapsed time from a deposit time to a receipt time of the luggage 4 that is a receipt target. For example, the fee calculation module 123 calculates the elapsed time based on a difference between a storage end time and a storage start time of the luggage 4 stored in the luggage database 111. In step S86, the fee calculation module 123 calculates a movement distance of the luggage 4 from the deposit time to the receipt time of the luggage 4 that is a receipt target. For example, the fee calculation module 123 calculates a movement distance (hereinafter referred to as a "transport distance") of all the storage spots 3 (hereinafter referred to as "related spots") involved in the storing of the luggage 4 that is a receipt target during the storing of the luggage 4 based on a history of the positions stored in the spot position database 112, and calculates the movement distance of the luggage 4 by adding the transport distances of all the related spots. In step S87, the fee calculation module 123 calculates a use fee of the storage service of the luggage 4 based on the elapsed time calculated in step S85 and the movement distance calculated in step S86. For example, the fee calculation module 123 calculates the use fee for a time by multiplying the elapsed time by a set fee per time, calculates the use fee for a distance by multiplying the movement distance by a set fee per distance, and calculates the use fee by summing the use fee for a time and the use fee for a distance.

Next, the server 100 may execute steps S88 and S89 in order. In step S88, the return processing module 124 waits for acquisition of a return completion notification from the storage spot terminal 200. In step S89, the return processing module 124 updates the content of the luggage database 111 according to the return of the luggage 4. For example, the return processing module 124 changes the combination data of the identification information of the storage spot 3 from which the return of the luggage 4 has completed and the identification information of the tag 2 attached to the luggage 4 to a storage completion state (a state in which the completion flag is 1) in the luggage database 111. Then, the return process procedure for the stored luggage 4 is completed. The server 100 repeatedly executes this procedure.

As described above, the luggage storage system 1 may include the tag 2 attached to the luggage 4, the plurality of storage spot terminals 200 respectively installed in the plurality of storage spots 3 each including the movable spot 3A, and the luggage database 111 that stores the information on the luggage 4. Additionally, the luggage storage system 1 may include the first registration module 113 that acquires the identification information of the tag 2 and the identification information of the user from the mobile terminal 300 that has read the identification information of the tag 2 attached to the luggage 4 at the time of deposit of the luggage 4 and registers the identification information of the tag 2 and the identification information of the user in the luggage database 111 in association with each other. Still further, the luggage storage system 1 may include the second registration module 114 that acquires the identification information of the tag 2 and the identification information of the storage spot 3 from the storage spot terminal 200 that has read the identification information of the tag 2, and registers the identification information of the tag 2 and the identification information of the storage spot 3 in the luggage database 111 in association with each other. The luggage storage system 1 may also include the return determination module 122 that acquires the identification information of the tag 2 and the identification information of the user from the mobile terminal 300 that has read the tag 2 at the time of receipt of the luggage 4 and determines whether or not to return of the luggage 4 based on whether or not the identification information of the tag 2 and the identification information of the user are associated with each other in the luggage database 111.

The luggage storage system 1 may be configured to rapidly perform the registration of the deposited luggage 4 and the authentication of receipt of the luggage 4 based on communication with the mobile terminal 300 of the user. Further, the luggage storage system 1 may be configured to update the deposit spot 3 of the luggage 4 in real time based on the communication with the deposit spot terminal 200. Therefore, the luggage storage system 1 may be configured to easily track the position of the luggage 4. For example, even when the luggage 4 is reloaded between the deposit spots 3, the luggage storage system 1 may be configured to update the deposit spot 3 based on the communication with the storage spot terminal 200. Thus, the luggage storage system 1 may be configured to provide a highly convenient luggage storage service with high mobility of the movable spot 3A by enabling rapid deposit and receipt of the luggage 4 and enabling easy tracking of the position of the luggage 4.

The luggage storage system 1 may include the storage candidate presentation module 116 that acquires the current position information of the mobile terminal 300 from the mobile terminal 300 and transmits the current position information of the storage spot 3 in the first reference area including a position indicated by the current position information of the mobile terminal 300 to the mobile terminal 300. In some examples, the convenience of the luggage storage service may be further improved by making it easier to select the storage spot 3 close to the current position of the mobile terminal 300.

The luggage storage system 1 may further include the status notification module 117 that acquires the request for transmission of the current position information of the tag 2 from the mobile terminal 300, acquires the identification information of the current storage spot 3 associated with the identification information of the tag 2 from the luggage database 111, and transmits the current position information of the storage spot 3 to the mobile terminal 300. In some examples, the convenience of the luggage storage service may be further improved by enabling tracking of the position of the luggage 4 using the mobile terminal 300.

The luggage storage system 1 may further include the transport route setting module 119 that acquires a designation of the storage spot 3 for receipt of the luggage 4 from the mobile terminal 300, acquires identification information of the current storage spot 3 associated with the identification information of the tag 2 attached to the luggage 4 from the luggage database 111, and sets a transport route of the luggage 4 from the current storage spot 3 to the storage spot 3 for receipt. In some examples, the convenience of the luggage storage service may be further improved by enabling receipt of the luggage 4 at the storage spot 3 designated by the user.

The luggage storage system 1 may further include the receipt candidate presentation module 118 that acquires desired position information for receipt of the luggage 4 from the mobile terminal 300 and transmits the current position information of the storage spot 3 in a second reference area including the position indicated by the desired position information to the mobile terminal 300. In some examples, the convenience of the luggage storage service may be further improved by making it easier to select the storage spot 3 close to a desired receipt position of the luggage 4.

The luggage storage system 1 may further include a fee calculation module 123 that calculates an elapsed time from a deposit time to a receipt time of the luggage 4 and calculates a use fee of the luggage storage service based on the elapsed time. By automatically calculating the use fee according to the degree of use of the luggage storage service with high rationality, the convenience of the luggage storage service may be further improved.

The fee calculation module 123 may further calculate a movement distance from a deposit time to a receipt time of the luggage 4 and calculate the use fee based on the elapsed time and the movement distance. By automatically calculating the use fee with high rationality, the convenience of the luggage storage service may be further improved.

The luggage storage system 1 may further include a fee calculation module 123 that calculates the movement distance from the deposit time to the receipt time of the luggage 4 and calculates a use fee of the luggage storage service based on the movement distance. By automatically calculating the use fee according to the degree of use of the luggage storage service with high rationality, the convenience of the luggage storage service may be further improved.

The luggage storage system 1 may be configured to store luggage from a user at any one of a plurality of storage spots including movable spots and to return the luggage to the user at any of the plurality of storage spots.

It is to be understood that not all aspects, advantages and features described herein may necessarily be achieved by, or included in, any one particular example embodiment. Indeed, having described and illustrated various examples herein, it should be apparent that other examples may be modified in arrangement and detail. For example, although some of the example methods and operations disclosed herein have been described as being performed sequentially, in some examples one or more of the steps or operations may be omitted, performed at the same time, or performed in a different order than that described or illustrated in the drawings (e.g., at FIGS. 6-14). Additionally, whereas some of the steps may be described as being executed by one or more "modules," in some examples, some or all of the steps may be performed by one or more controllers, servers, processing devices and/or hardware devices, and as further described above with respect to the example hardware configurations illustrated in FIGS. 1, 2, and/or 5.

We claim all modifications and variations coming within the spirit and scope of the subject matter claimed herein.

Additionally, one or more of the example embodiments described above can be expressed by the following appendices.

Appendix 1

A luggage storage system comprising:
a tag attached to luggage;
a plurality of storage spot terminals installed in a plurality of storage spots each including a movable spot;
a database configured to store information on the luggage;
a first registration module configured to acquire identification information of the tag and identification information of a user from a mobile terminal that has read the identification information of the tag attached to the luggage at the time of deposit of the luggage and to register the identification information of the tag and the identification information of the user in the database in association with each other;

a second registration module configured to acquire the identification information of the tag and identification information of the storage spot from the storage spot terminal that has read the identification information of the tag and to register the identification information of the tag and the identification information of the storage spot in the database in association with each other; and a return determination module configured to acquire the identification information of the tag and the identification information of the user from the mobile terminal that has read the tag at the time of receipt of the luggage and to determine whether or not to return the luggage based on whether or not the identification information of the tag and the identification information of the user are associated with each other in the database.

Appendix 2

The luggage storage system according to appendix 1, further comprising a storage candidate presentation module configured to acquire current position information of the mobile terminal from the mobile terminal and to transmit current position information of the storage spot in a first reference area including a position indicated by the current position information of the mobile terminal to the mobile terminal.

Appendix 3

The luggage storage system according to appendix 1 or 2, further comprising a status notification module configured to acquire a request for transmission of current position information of the tag from the mobile terminal, to acquire the identification information of the current storage spot associated with the identification information of the tag from the database, and to transmit the current position information of the storage spot to the mobile terminal.

Appendix 4

The luggage storage system according to any one of appendices 1 to 3, further comprising a transport route setting module configured to acquire a designation of the storage spot for receipt of the luggage from the mobile terminal, to acquire identification information of the current storage spot associated with the identification information of the tag attached to the luggage from the database, and to set a transport route of the luggage from the current storage spot to the storage spot for receipt.

Appendix 5

The luggage storage system according to any one of appendices 1 to 4, further comprising a receipt candidate presentation module configured to acquire desired position information for receipt of the luggage from the mobile terminal and to transmit the current position information of the storage spot in a second reference area including a position indicated by the desired position information to the mobile terminal.

Appendix 6

The luggage storage system according to any one of appendices 1 to 5, further comprising a fee calculation module configured to calculate an elapsed time from a deposit time to a receipt time of the luggage and to calculate a use fee of a luggage storage service based on the elapsed time.

Appendix 7

The luggage storage system according to appendix 6, wherein the fee calculation module is further configured to calculate a movement distance from a deposit time to a receipt time of the luggage and to calculate the use fee based on the elapsed time and the movement distance.

Appendix 8

The luggage storage system according to any one of appendices 1 to 5, further comprising a fee calculation module configured to calculate a movement distance from a deposit time to a receipt time of the luggage and to calculate a use fee of a luggage storage service based on the movement distance.

Appendix 9

A method executed by a server for management of stored luggage, the method comprising:

acquiring identification information of a tag attached to luggage and identification information of a user from a mobile terminal that has read the identification information of the tag at the time of depositing the luggage and registering the identification information of the tag and the identification information of the user in a database in association with each other;

acquiring the identification information of the tag and identification information of a storage spot from a storage spot terminal that has read the identification information of the tag and registering the identification information of the tag and the identification information of the storage spot in the database in association with each other; and acquiring the identification information of the tag and the identification information of the user from the mobile terminal that has read the tag at the time of receipt of the luggage and determining whether or not to return the luggage based on whether or not the identification information of the tag and the identification information of the user are associated in the database.

The invention claimed is:

1. A luggage storage system comprising:
a mobile storage terminal installed in a mobile luggage storage vehicle; and
a server configured to:
acquire, from a hand-held mobile terminal of a user, a user identifier that identifies the user, and a tag identifier that identifies a luggage tag in response to reading of the luggage tag by the hand-held mobile terminal, the luggage tag configured to be attached to a luggage;
register the user identifier in a luggage database so that the user identifier is associated with the tag identifier in the luggage database in response to acquiring the user identifier and the tag identifier from the hand-held mobile terminal;
acquire, from the mobile storage terminal, the tag identifier and a mobile storage identifier that identifies the mobile luggage storage vehicle, in response to reading of the luggage tag by the mobile storage terminal;
register the mobile storage identifier in the luggage database so that the mobile storage identifier is associated with the tag identifier and the user identifier in the luggage database in response to acquiring the mobile storage identifier and the tag identifier from the mobile storage terminal;

acquire a current storage position of the mobile luggage storage vehicle from the mobile storage terminal;

determine a current luggage position of the luggage based on an association between the mobile storage identifier and the tag identifier in the luggage database, and the current storage position;

transmit the current luggage position to the hand-held mobile terminal;

acquire, from the hand-held mobile terminal, a luggage release request with the user identifier in response to rescanning of the luggage tag by the hand-held mobile terminal; and upon verifying that the user identifier acquired with the luggage release request is associated with the tag identifier in the luggage database, authorize a release of luggage associated with the luggage tag.

2. The luggage storage system according to claim 1 further comprising a plurality of storage terminals including the mobile storage terminal, the plurality of storage terminals installed in a plurality of luggage storages, the plurality of luggage storages including the mobile luggage storage vehicle, wherein the server is further configured to:

acquire a current user position of the hand-held mobile terminal from the hand-held mobile terminal;

extract one or more available luggage storages from the plurality of luggage storages based on the current user position; and transmit current storage positions of the one or more available luggage storages to the hand-held mobile terminal.

3. The luggage storage system according to claim 1 comprising a plurality of storage terminals including the mobile storage terminal, the plurality of storage terminals installed in a plurality of luggage storages, the plurality of luggage storages including the mobile luggage storage vehicle, wherein the server is further configured to:

acquire, from a first storage terminal of the plurality of storage terminals installed in a first luggage storage, the tag identifier and a first storage identifier that identifies the first luggage storage, in response to scanning of the luggage tag by the first storage terminal;

register the first storage identifier in the luggage database so that the first storage identifier is associated with the tag identifier and the user identifier in the luggage database in response to acquiring the first storage identifier and the tag identifier from the first storage terminal;

acquire, from a second storage terminal of the storage terminals installed in a second luggage storage of the plurality of luggage storages, a second storage identifier that identifies the second luggage storage, and the tag identifier in response to scanning of the luggage tag by the second storage terminal; and replace the first storage identifier with the second storage identifier including in response to acquiring the second storage identifier and the tag identifier from the second storage terminal.

4. The luggage storage system according to claim 3, wherein the server is further configured to:

identify a current luggage storage of the plurality of luggage storages based on a current storage identifier associated with the tag identifier in the luggage database;

acquire the current storage position from a current storage terminal installed in the current luggage storage;

determine the luggage position based on an association between the current storage identifier and the tag identifier in the luggage database, and the current storage position; and transmit the current luggage position to the hand-held mobile terminal.

5. The luggage storage system according to claim 3, wherein the storage terminals include a plurality of mobile storage terminals installed in a plurality of mobile luggage storage vehicles, and wherein the server is further configured to:

acquire a delivery request identifying a final destination of the luggage from the hand-held mobile terminal;

set a transport route to the final destination;

select two mobile luggage storage vehicles from the plurality of mobile luggage storage vehicles as the first and second luggage storages in accordance with the transport route; and request, to the first and second storage terminals, a transfer of the luggage between the first and second luggage storages so that the luggage is redirected from a first transport route associated with the first luggage storage to a second transport route associated with the second luggage storage.

6. The luggage storage system according to claim 5, wherein the storage terminals include a plurality of fixed storage terminals installed in a plurality of fixed luggage storages, and wherein the server is further configured to:

acquire a delivery request identifying a final destination of the luggage from the hand-held mobile terminal;

set a transport route to the final destination;

select one mobile luggage storage vehicle from the plurality of mobile luggage storage vehicles and one fixed storage from the plurality of fixed luggage storages as the first and second luggage storages in accordance with the transport route; and request, to the first and second storage terminals, a transfer of the luggage between the first luggage storage and the second luggage storage so that the luggage is delivered to the second luggage storage.

7. The luggage storage system according to claim 6, wherein the server is further configured to:

acquire a desired final destination of the luggage from the hand-held mobile terminal;

extract one or more fixed luggage storages available for use as the final destination from the plurality of fixed luggage storages based on the desired final destination; and transmit positions of the one or more fixed luggage storages to the hand-held mobile terminal.

8. The luggage storage system according to claim 1, wherein the server is further configured to:

calculate an elapsed time from a time of deposit to a time of release of the luggage; and calculate a luggage storage fee based, at least in part, on the elapsed time.

9. The luggage storage system according to claim 1, wherein the server is further configured to:

calculate a delivery distance travelled by the luggage; and calculate a luggage storage fee based, at least in part, on the delivery distance.

10. The luggage storage system according to claim 1, wherein the server is further configured to:

calculate an elapsed time from a time of deposit to a time of release of the luggage;

calculate a delivery distance travelled by the luggage; and
calculate a luggage storage fee based on both the elapsed time and the delivery distance.

11. The luggage storage system according to claim 1, wherein the server is further configured to, upon verifying that the user identifier acquired with the luggage release request is associated with the tag identifier currently associated with the mobile storage identifier in the luggage database, authorize a release of luggage associated with the luggage tag from the mobile luggage storage vehicle.

12. The luggage storage system according to claim 1, further comprising a second mobile storage terminal installed in a second mobile luggage storage vehicle, wherein the server is further configured to:
    acquire, in response to scanning of the luggage tag by the second mobile storage terminal, a second mobile storage identifier that identifies the second mobile luggage storage vehicle, and the tag identifier currently associated with the mobile storage identifier in the luggage database;
    replace the mobile storage identifier with the second mobile storage identifier in response to acquiring the second mobile storage identifier and the tag identifier from the second mobile storage terminal; and
    upon verifying that the user identifier acquired with the luggage release request is associated with the tag identifier currently associated with the second mobile storage identifier in the luggage database, authorize a release of luggage associated with the luggage tag from the second mobile luggage storage vehicle.

13. The luggage storage system according to claim 1, further comprising a fixed storage terminal installed in a fixed luggage storage, wherein the server is further configured to:
    acquire, in response to scanning of the luggage tag by the fixed storage terminal, the tag identifier and a fixed storage identifier that identifies the fixed luggage storage;
    register the fixed storage identifier in the luggage database so that the fixed storage identifier is associated with the tag identifier and the user identifier in the luggage database in response to acquiring the fixed storage identifier and the tag identifier from the fixed storage terminal;
    acquire, in response to scanning of the luggage tag by the mobile storage terminal, the mobile storage identifier and the tag identifier currently associated with the fixed storage identifier in the luggage database; and
    replace the fixed storage identifier with the mobile storage identifier in response to acquiring the mobile storage identifier and the tag identifier from the mobile storage terminal.

14. The luggage storage system according to claim 1, further comprising a fixed storage terminal installed in a fixed luggage storage, wherein the server is further configured to:
    acquire, in response to scanning of the luggage tag by the fixed storage terminal, a fixed storage identifier that identifies the fixed luggage storage, and the tag identifier currently associated with the mobile storage identifier in the luggage database;
    replace the mobile storage identifier with the fixed storage identifier in response to acquiring the fixed storage identifier and the tag identifier from the fixed storage terminal; and
    upon verifying that the user identifier acquired with the luggage release request is associated with the tag identifier currently associated with the fixed storage identifier in the luggage database, authorize a release of luggage associated with the luggage tag from the fixed luggage storage.

15. A method executed by a server for management of stored luggage, the method comprising:
    acquiring, from a hand-held mobile terminal of a user, a user identifier that identifies the user and a tag identifier that identifies a luggage tag, in response to reading of the luggage tag by the hand-held mobile terminal, the luggage tag configured to be attached to a luggage;
    registering the user identifier in a luggage database so that the user identifier is associated with the tag identifier in the luggage database in response to acquiring the user identifier and the tag identifier from the hand-held mobile terminal;
    acquiring, from a mobile storage terminal, the tag identifier and a mobile storage identifier that identifies a mobile luggage storage vehicle, in response to reading of the luggage tag by the mobile storage terminal, wherein the mobile storage terminal is installed in the mobile luggage storage vehicle;
    registering the mobile storage identifier in the luggage database so that the mobile storage identifier is associated with the tag identifier and the user identifier in the luggage database in response to acquiring the mobile storage identifier and the tag identifier from the mobile storage terminal;
    acquiring a current storage position of the mobile luggage storage vehicle from the mobile storage terminal;
    determining a current luggage position of the luggage based on an association between the mobile storage identifier and the tag identifier in the luggage database, and the current storage position;
    transmitting the current luggage position to the hand-held mobile terminal;
    acquiring, from the hand-held mobile terminal, a luggage release request with the user identifier in response to rescanning of the luggage tag by the hand-held mobile terminal; and
    upon verifying that the user identifier acquired with the luggage release request is associated with the tag identifier in the luggage database, authorizing a release of luggage associated with the luggage tag.

16. The method according to claim 15, wherein authorizing the release of luggage includes, upon verifying that the user identifier acquired with the luggage release request is associated with the tag identifier currently associated with the mobile storage identifier in the luggage database, authorizing a release of luggage associated with the luggage tag from the mobile luggage storage vehicle.

17. The method according to claim 15, further comprising:
    acquiring, in response to scanning of the luggage tag by a second mobile storage terminal, a second mobile storage identifier that identifies a second mobile luggage storage vehicle, and the tag identifier currently associated with the mobile storage identifier in the luggage database, wherein the second mobile storage terminal is installed in the second mobile luggage storage vehicle; and
    replacing the mobile storage identifier with the second mobile storage identifier in response to acquiring the second mobile storage identifier and the tag identifier from the second mobile storage terminal,
    wherein authorizing the release of luggage includes, upon verifying that the user identifier acquired with the luggage release request is associated with the tag identifier currently associated with the second mobile storage identifier in the luggage database, authorizing a release of luggage associated with the luggage tag from the second mobile luggage storage vehicle.

18. The method according to claim 15, further comprising:
    acquiring, in response to scanning of the luggage tag by a fixed storage terminal, the tag identifier and a fixed storage identifier that identifies a fixed luggage storage, wherein the fixed storage terminal is installed in the fixed luggage storage; and
    registering the fixed storage identifier in the luggage database so that the fixed storage identifier is associated with the tag identifier and the user identifier in the luggage database in response to acquiring the fixed storage identifier and the tag identifier from the fixed storage terminal,
    wherein acquiring the mobile storage identifier includes acquiring the tag identifier currently associated with the fixed storage identifier in the luggage database, in response to scanning of the luggage tag by the mobile storage terminal, and
    wherein registering the mobile storage identifier in the luggage database includes replacing the fixed storage identifier with the mobile storage identifier in response to acquiring the mobile storage identifier and the tag identifier from the mobile storage terminal.

19. The method according to claim 15, further comprising:
    acquiring, in response to scanning of the luggage tag by a fixed storage terminal, a fixed storage identifier that identifies a fixed luggage storage and the tag identifier currently associated with the mobile storage identifier in the luggage database, wherein the fixed storage terminal is installed in the fixed luggage storage; and
    replacing the mobile storage identifier with the fixed storage identifier in response to acquiring the fixed storage identifier and the tag identifier from the fixed storage terminal,
    wherein authorizing the release of luggage includes, upon verifying that the user identifier acquired with the luggage release request is associated with the tag identifier currently associated with the fixed storage identifier in the luggage database, authorizing a release of luggage associated with the luggage tag from the fixed luggage storage.

20. A memory device having instructions stored thereon that, in response to execution by a hand-held mobile processing device, cause the hand-held mobile processing device to perform operations comprising:
    scanning a tag to be attached to a luggage;
    transmitting, to a server for management of stored luggage, a user identifier that identifies a user of the hand-held mobile processing device and a tag identifier including that identifies the tag, in response to scanning of the tag;
    acquiring, from the server, a current position information of a mobile luggage storage vehicle storing the luggage;
    displaying a current position of the mobile luggage storage vehicle based on the current position information;
    rescanning the tag attached to the luggage; and
    transmitting, to the server, the user identifier and the tag identifier to the server in response to rescanning of the tag for verification that a user of the hand-held mobile processing device is associated with the tag identifier in the server.

* * * * *